United States Patent [19]

Jones

[11] Patent Number: 4,580,828
[45] Date of Patent: Apr. 8, 1986

[54] TAILGATE FOR A PICKUP TRUCK

[76] Inventor: Charles W. Jones, 20 Chesdin Rd., Petersburg, Va. 23803

[21] Appl. No.: 701,185

[22] Filed: Feb. 13, 1985

[51] Int. Cl.$^4$ .............................................. B60J 5/10
[52] U.S. Cl. .................................... 296/57 R; 49/254
[58] Field of Search ................... 296/50, 51, 56, 57 R, 296/58, 61; 49/254, 257, 260; 312/322, 323

[56] References Cited

U.S. PATENT DOCUMENTS

| | | | |
|---|---|---|---|
| 2,431,588 | 11/1947 | Sharpe | 296/50 |
| 2,744,782 | 5/1956 | Backman | 296/50 |
| 2,852,303 | 9/1958 | Hopson | 296/26 |
| 3,148,912 | 9/1964 | Curtis et al. | 296/50 |
| 4,114,944 | 9/1978 | Joynt et al. | 296/50 |
| 4,475,759 | 10/1984 | Wine | 296/50 |

Primary Examiner—Robert R. Song
Attorney, Agent, or Firm—Norman B. Rainer

[57] ABSTRACT

An improved tailgate apparatus is provided for use on the rear of the cargo compartment of pickup trucks. The apparatus is comprised of a tailgate panel which attaches to the cargo compartment with the aid of paired flat arms, and storage compartment located beneath the floor of the cargo compartment. In use, the tailgate panel can be positioned in either a closed position, a first open position where it extends rearwardly from the cargo compartment or a second open position where it is housed within said storage compartment.

4 Claims, 3 Drawing Figures

TAILGATE FOR A PICKUP TRUCK

BACKGROUND OF THE INVENTION

This invention relates to closure apparatus for the cargo compartment of a truck, and more particularly concerns an improved tailgate apparatus for use on pickup trucks.

Pickup trucks are generally characterized as having an upwardly open rectangular cargo space rearward of the cab portion of the vehicle. The cargo space is generally defined by two opposed side panels, a forward panel adjacent to or incorporated into the cab, a floor, and a pivotably mounted rear panel known as a tailgate.

The tailgate usually has two positions, namely the closed position wherein the panel is upwardly directed to complete the enclosure of the cargo space, and a down or open position wherein the tailgate is either horizontally disposed rearwardly from the cargo compartment and substantially coplanar with the floor, or pendantly supported by the pivot means in a downwardly disposed position.

Although the horizontally disposed down position of the tailgate has several advantageous uses, there are situations wherein it is desired to have the tailgate down, but where rearward protrusion, or downwardly hanging disposition is undesirable. One such situation is in driving the vehicle with an empty cargo compartment wherein wind resistance of the moving vehicle is reduced when the tailgate is down. Another situation is in backing the pickup truck into close adjacency to a loading dock upon which the cargo is to be transferred. A still further situation is in loading cargo into the cargo compartment from a location rearward and below the tailgate.

It is accordingly an object of the present invention to provide a tailgate having improved versatility of operation.

It is another object of the present invention to provide a tailgate for a pickup truck having the ability to be positioned in a manner to cause the rear of the cargo compartment to be open, without extending rearwardly or downwardly with respect to said compartment.

It is a further object of this invention to provide an improved tailgate of the aforesaid nature of rugged and durable construction and amenable to low cost manufacture.

These objects and other objects and advantages of the invention will be apparent from the following description.

SUMMARY OF THE INVENTION

The above and other beneficial objects and advantages are accomplished in accordance with the present invention by a tailgate apparatus positioned at the rearward extremity of a cargo compartment having a horizontal floor and vertical sidewalls, said apparatus comprising:

(a) a rigid tailgate panel of generally rectangular configuration having upper and lower horizontal edges and opposed side edges, (b) a first bearing post extending horizontally outwardly from each side edge adjacent the lower horizontal edge, (c) brace means associated with each side edge of said tailgate and comprised of upper and lower elongated flat arms, one of said arms having an elongated slot, the other arm having a second bearing post adapted to slidably engage said slot, the proximal upper extremity of the upper arm being pivotably attached to a corresponding sidewall of said cargo compartment, the proximal lower extremity of the lower arm being pivotably attached to a corresponding side edge of the tailgate, the distal extremities of said arms being in facing juxtaposition and interengaged by said second bearing post, and (d) a storage compartment located in the floor of the cargo compartment, having a size adequate to accommodate said tailgate, and having paired horizontally oriented track means adapted to slideably retain the first bearing posts of said tailgate, whereby (e) said first bearing posts permit pivotal and sliding movement of the tailgate, and (f) said tailgate can be adjustably positioned between an upright closed position, a first open position extending horizontally rearwardly from the cargo compartment, and a second open position wherein said tailgate is stored beneath said cargo compartment in horizontal disposition.

In preferred embodiments of the invention, the several bearing posts may be comprised of rollers adapted to facilitate movement of the posts within their respective tracks or slots. The lengths of the tracks and slots are sufficiently long to establish appropriate stopping points for the three positions of the tailgate.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

Figure 2:
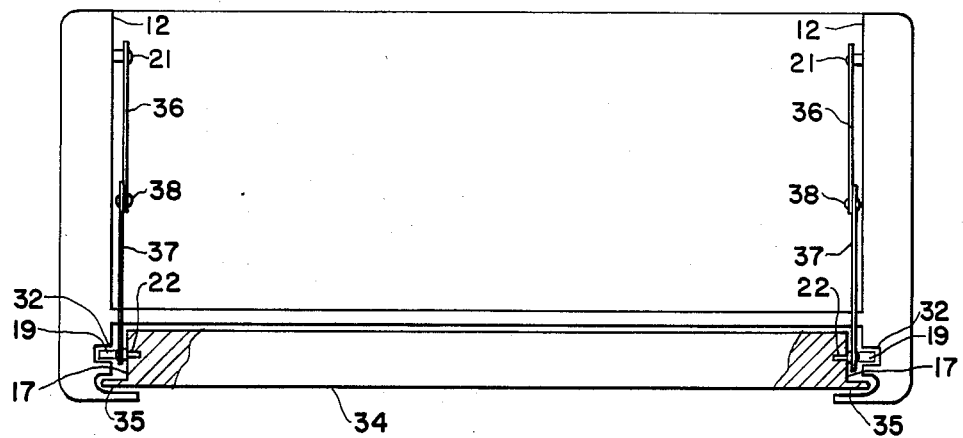
FIG. 2 is a rear view of the embodiment of FIG. 1.
Figure 3:
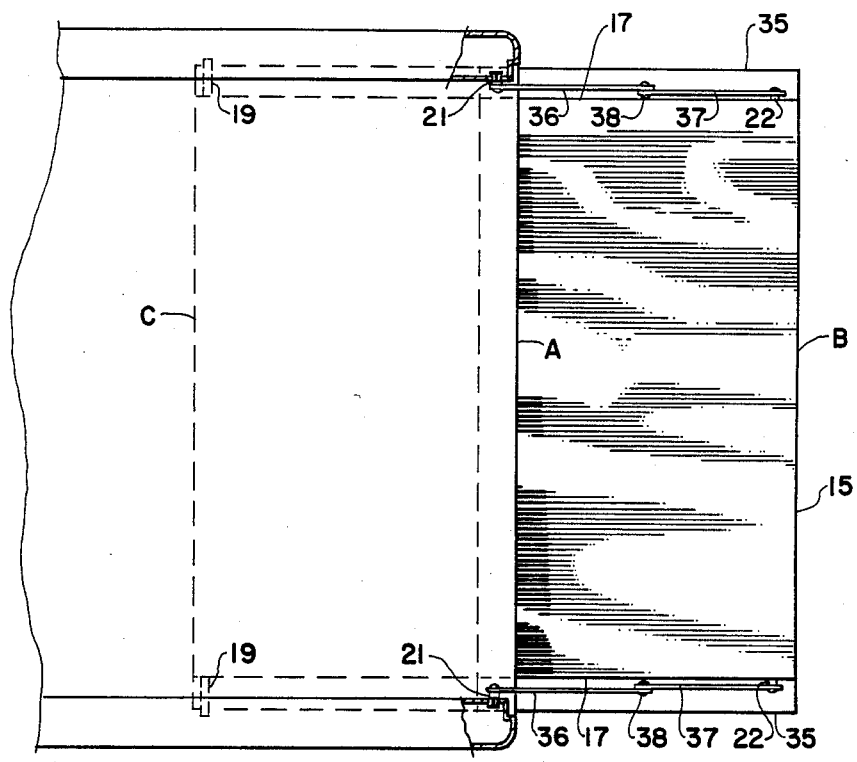
FIG. 3 is a top view of the embodiment of FIG. 1.

For ease of description, the terms "inner" and "outer" or equivalents thereof will refer to the interiorly and exteriorly directed portions, respectively, with respect to the cargo compartment shown in FIG. 2. Similarly, the expressions "upper" and "lower" and terms of similar import will have reference to upper and lower portions, respectively, with respect to said cargo compartment.

DESCRIPTION OF THE PREFERRED EMBODIMENT

Referring to the drawing, the rearward extremity of a cargo compartment 10 of a pickup truck of conventional design, is shown equipped with tailgate apparatus 11 of the present invention. The cargo compartment is defined by opposed side panels 12, a forward panel (not shown), floor 13, and tailgate panel 14.

The tailgate apparatus is comprised of tailgate panel 14 of generally rectangular configuration having upper and lower horizontal edges 15 and 16, respectively, and opposed side edges 17. The outer surface 34 of panel 14 extends beyond side edges 17, forming elongated overhang strips 35. A first bearing post 19 of circular cylindrical contour extends horizontally outward from each side edge 17 adjacent lower horizontal edge 16.

Brace means 20, associated with each side edge of the tailgate panel, is comprised of upper and lower elongated flat arms 36 and 37, respectively. The upper or proximal extremity of each upper arm is attached by pivot bolt 21 to a corresponding sidewall of the cargo compartment. The lower or proximal extremity of lower arm 37 is attached by pivot bolt 22 to a corresponding side edge of the tailgate panel. Upper arm 36 is provided with coextensively oriented elongated slot 28. Second bearing post 38 is fixedly attached to the distal extremity 18 of lower arm 37, and slidably engages slot 38.

The distal, or traveling extremities of the arms are accordingly interengaged in a manner permitting scissor-like folding in a vertical plane. In other embodiments, the locations of the elongated slot and second bearing post may be reversed amongst the arms. The bearing posts may utilize frictionless roller sleeves to facilitate movement within the slots, and may be further provided with a retaining head of conventional design to ensure engagement with the slot.

A storage compartment 30 is positioned beneath the upwardly disposed surface 31 of floor 13, said storage compartment having a size and shape adequate to accommodate tailgate panel 14. Horizontally oriented track means in the form of grooves 32 associated with said storage compartment and recessed into the side panels are adapted to slideably retain first bearing posts 19 attached to the tailgate panel.

Figure 1:
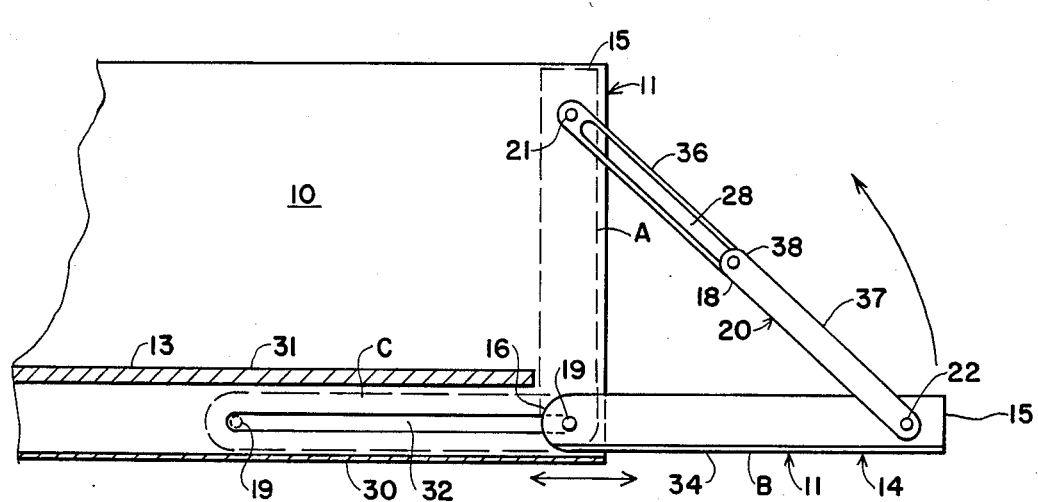
FIG. 1 is a side view of an embodiment of the tailgate apparatus of this invention showing the tailgate in its rearwardly disposed open position and, in phantom outline, showing the closed position and the stored open position.

In the operation of the tailgate apparatus, when the tailgate panel is in its upright closed position, designated position A in FIG. 1, arms 36 and 37 are in a folded vertical disposition, and first bearing posts 19 are at the rearward extremities of track means 32.

When the tailgate panel is in its lower rearwardly protruding position, designated position B in FIG. 1, arms 36 and 37 are aligned along a straight line diagonally disposed between the cargo compartment and tailgate panel, and first bearing posts 19 are at the rearward extremity of third track means 32.

When the tailgate panel is in its lower stored position, designated position C in FIG. 1, arms 36 and 37 are vertically oriented but unfolded, the second bearing posts are adjacent the upper extremity of slots 28, and first bearing posts 19 are at the forward extremities of third track means 32.

Suitable locking mechanisms of conventional design may be utilized to maintain the tailgate panel in each of its three positions.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A tailgate apparatus adapted to be positioned at the rearward extremity of a cargo compartment having a horizontal floor and vertical sidewalls, said apparatus comprising:
    (a) a rigid tailgate panel of generally rectangular configuration having upper and lower horizontal edges and opposed side edges,
    (b) a first bearing post extending horizontally outwardly from each side edge adjacent the lower horizontal edge,
    (c) brace means associated with each side edge of said tailgate panel and comprised of upper and lower elongated flat arms, one of said arms having an elongated slot, the other arm having a second bearing post adapted to slidably engage said slot, the proximal upper extremity of the upper arm being pivotably attached to a corresponding sidewall of said cargo compartment, the proximal lower extremity of the lower arm being pivotably attached to a corresponding side edge of the tailgate panel, the distal extremities of said arms being in facing juxtaposition and interengaged by said second bearing post, and
    (d) a storage compartment located in the floor of the cargo compartment, having a size adequate to accommodate said tailgate panel, and having paired horizontally oriented track means adapted to slideably retain the first bearing posts of said tailgate panel, whereby
    (e) said first bearing posts permit pivotal and sliding movement of the tailgate panel, and
    (f) said tailgate panel can be adjustably positioned between an upright closed position, a first open position extending horizontally rearwardly from the cargo compartment, and a second open position wherein said tailgate panel is stored beneath said cargo compartment in horizontal disposition.

2. The apparatus of claim 1 wherein said bearing posts are comprised of rollers adapted to facilitate movement of the posts within their respective tracks or slots.

3. The apparatus of claim 2 wherein the lengths of said tracks and slots are such as to establish appropriate stopping points for said rollers.

4. The apparatus of claim 3 wherein: (a) when said tailgate panel is in its upright closed position, said arms are in a folded vertical disposition, (b) when said tailgate panel is in its first open position, said arms are aligned along a straight line diagonally disposed between said cargo compartment and said tailgate panel, and (c) when said tailgate panel is in its second open position, said arms are in an unfolded vertical disposition.

* * * * *